United States Patent
Sun et al.

(10) Patent No.: US 11,532,174 B2
(45) Date of Patent: Dec. 20, 2022

(54) PRODUCT BASELINE INFORMATION EXTRACTION

(71) Applicant: International Business Machines Corporation, Armonk, NY (US)

(72) Inventors: Changhua Sun, Beijing (CN); HongLei Guo, Beijing (CN); Birgit Monika Pfitzmann, Wettswil (CH); Dorothea Wiesmann Rothuizen, Oberrieden (CH); Lynette Yvonne Mitchell, Gainesville, FL (US); Brent Alan Goebel, Damiansville, IL (US)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 16/701,191

(22) Filed: Dec. 3, 2019

(65) Prior Publication Data
US 2021/0166016 A1  Jun. 3, 2021

(51) Int. Cl.
*G06V 30/414* (2022.01)
*G06Q 30/06* (2012.01)

(52) U.S. Cl.
CPC ....... *G06V 30/414* (2022.01); *G06Q 30/0627* (2013.01)

(58) Field of Classification Search
CPC ................. G06K 9/00463; G06Q 30/0627
See application file for complete search history.

(56) References Cited

U.S. PATENT DOCUMENTS

| | | | | |
|---|---|---|---|---|
| 7,376,613 | B1* | 5/2008 | Cofino | G06Q 20/10 705/26.3 |
| 7,809,672 | B1* | 10/2010 | Tenorio | G06Q 30/0629 705/26.64 |
| 8,935,239 | B2 | 1/2015 | Mukherjee et al. | |
| 10,223,585 | B2* | 3/2019 | Cohen | G06K 9/627 |
| 10,242,257 | B2* | 3/2019 | Hosabettu | G06K 9/00449 |
| 10,846,527 | B2* | 11/2020 | Mills, Jr. | G06K 9/00483 |
| 2010/0070500 | A1* | 3/2010 | Cui | G06F 16/25 707/736 |
| 2012/0102416 | A1* | 4/2012 | Chmiel | G06F 9/44526 715/760 |
| 2013/0290338 | A1* | 10/2013 | Lee | G06F 16/36 707/739 |
| 2014/0129388 | A1* | 5/2014 | Frederick | G06Q 30/0623 705/26.61 |
| 2015/0186352 | A1* | 7/2015 | Greenwood | G06F 40/14 715/217 |
| 2015/0339616 | A1 | 11/2015 | Pursche et al. | |
| 2017/0139966 | A1* | 5/2017 | Azoulay | G06F 16/24566 |
| 2017/0161658 | A1 | 6/2017 | Burkhart et al. | |

(Continued)

*Primary Examiner* — Thu V Huynh
(74) *Attorney, Agent, or Firm* — Edward J. Wixted, III

(57) ABSTRACT

In an approach for automatically extracting product baseline information from a request for proposal document, a processor receives the document. A processor detects a table in the document. A processor identifies a table header on the table. The table header is associated with a name and an associated volume of the product. A processor extracts context based on the table header from the table. The context includes the name and the associated volume of the product. A processor maps the extracted context with the name of the product in the table to an associated name of the product based on a pre-defined product ontology.

6 Claims, 8 Drawing Sheets

(56) References Cited

U.S. PATENT DOCUMENTS

2017/0161800 A1 6/2017 Burkhart et al.
2017/0228784 A1* 8/2017 Singh ................. G06Q 30/0255
2017/0243148 A1* 8/2017 Hosokawa ............. G06Q 10/20
2018/0239816 A1 8/2018 Di Balsamo et al.

* cited by examiner

| Growth Projection for Physical Servers - Infrastructure and Utility Servers (Managed by Vendor) | | | | | | | |
|---|---|---|---|---|---|---|---|
| # | Category | Number of Physical Servers | 2020 | 2021 | 2022 | 2023 | 2024 |
| 1 | AIX | 5 | 5 | 7 | 7 | 9 | 9 |
| 2 | Solaris | 15 | 12 | 7 | 10 | 8 | 5 |
| 3 | ESX | 42 | 20 | 22 | 24 | 26 | 30 |
| 4 | Linux | 67 | 62 | 55 | 50 | 35 | 30 |
| 5 | HPUX | 8 | 6 | 3 | 6 | 5 | 4 |
| 6 | WINTEL | 985 | 833 | 768 | 770 | 762 | 788 |

FIG. 3

| Asset Information | | | | |
|---|---|---|---|---|
| Devices | US | China | Japan | Grand Total |
| Access Point | 12103 | 4215 | 4771 | 21089 |
| Blade Switch | 374 | 92 | 36 | 502 |
| Ethernet Switch/Router | 7043 | 1847 | 2629 | 11519 |
| Managed Host | 24 | 7 | 9 | 40 |
| Network Optimizer | 25 | 26 | 25 | 76 |
| Vioce Access Gateway | 256 | 48 | 207 | 511 |
| Wireless Control | 188 | 110 | 147 | 445 |
| Grand Total | 20013 | 6345 | 7824 | 34182 |

FIG. 4

| Region | Campus | # Servers (DCMS) |
|---|---|---|
| AMR | Folsom | 17860 |
| AMR | Santa Clara | 135676 |
| AMR | Oregon | 40136 |
| AMR | Arizona | 4940 |
| AMR | New Mexico | 915 |
| AMR | Austin | 2197 |
| AMR | Fort Collins | 1437 |
| AMR | Hudson | 1098 |

FIG. 5

| EU | Resource Category | Description | Existing Baseline | Actuals | 2020 | 2021 | 2022 | 2023 |
|---|---|---|---|---|---|---|---|---|
| | Supported Servers | Type A Servers | | | | | | |
| | | France | 82 | 45 | 45 | 45 | 45 | 45 |
| | | Type B Servers | | | | | | |
| | | France | 366 | 252 | 252 | 252 | 252 | 252 |
| | DASD Storage | Usable GBs - US | | | | | | |
| | | France | 62000 | 98665 | 98665 | 103598 | 108778 | 114217 |
| | | Gb High Performance - France | 31000 | 67665 | 67665 | 71048 | 74601 | 78331 |

FIG. 6

| Mainframe Baselines | Year 1 | Year 2 |
|---|---|---|
| Storage | 2000 | 3000 |
| Batch Jobs per Month | 300 | 500 |

FIG. 7

PRODUCT BASELINE INFORMATION EXTRACTION

BACKGROUND

The present disclosure relates generally to the field of information extraction, and more particularly to processing and extracting product baseline information from a request for proposal document.

A request for proposal (RFP) process includes writing RFP documents comprising requests for information technology (IT) solutions and the search of the answers to the requests. RFP documents are usually very dense of details and the complete reading and understanding of the RFP documents requires huge efforts. Current systems that deal with the RFP processes are overwhelmed by incoming requests, which creates delays in providing answers. Quite often responses are not accurate, resulting in huge damages for the provider inadequate solutions, extra-cost, bad sizing, problems during the execution.

SUMMARY

Aspects of an embodiment of the present disclosure disclose an approach for automatically extracting product baseline information from a request for proposal document. A processor receives the document. A processor detects a table in the document. A processor identifies a table header on the table. The table header is associated with a name and an associated volume of the product. A processor extracts context based on the table header from the table. The context includes the name and the associated volume of the product. A processor maps the extracted context with the name of the product in the table to an associated name of the product based on a pre-defined product ontology.

BRIEF DESCRIPTION OF THE DRAWINGS

FIG. 3 illustrates an example table detection and product information extraction of the product information extractor included the computing device of FIG. 1, in accordance with an embodiment of the present disclosure.

FIG. 4 illustrates another example table detection and product information extraction of the product information extractor included the computing device of FIG. 1, in accordance with an embodiment of the present disclosure.

FIG. 5 illustrates yet another example table detection and product information extraction of the product information extractor included the computing device of FIG. 1, in accordance with an embodiment of the present disclosure.

FIG. 6 illustrates yet another example table detection and product information extraction of the product information extractor included the computing device of FIG. 1, in accordance with an embodiment of the present disclosure.

FIG. 7 illustrates yet another example table detection and product information extraction of the product information extractor included the computing device of FIG. 1, in accordance with an embodiment of the present disclosure.

DETAILED DESCRIPTION

Figure 1:
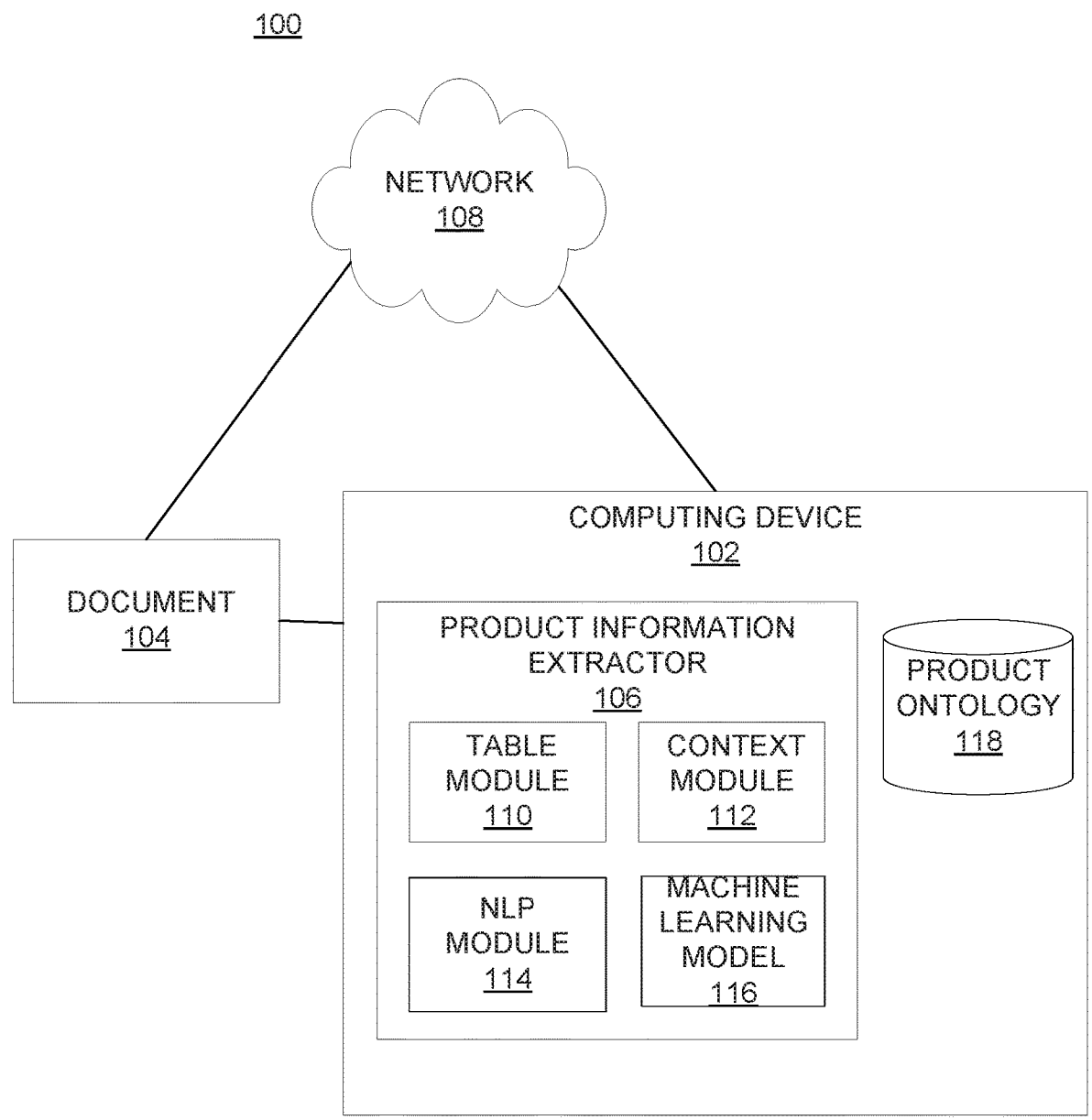
FIG. 1 is a functional block diagram illustrating product baseline information extraction environment, in accordance with an embodiment of the present disclosure.

The present disclosure is directed to systems and methods for automatically extracting the product baseline information from an RFP document.

RFP is one of the processes that require a semantic knowledge of data. An RFP process may include writing RFP documents comprising requests for information technology (IT) solutions and the search of the answers to the requests. RFP documents are usually very dense with detail and the complete reading and understanding of the RFP documents requires huge effort. A key information type in an RFP document is so-called baselines, i.e., volumes and names of products that a customer asks a vendor to provide and or manage, e.g., 500 servers, 50 databases, 10 firewalls, etc. The products may be, for example, devices, servers, software packages, services or any other solutions, services, or products that the customer may ask the vendor to provide and or manage. The customer may express the baselines in different terminologies from the vendor's terminologies, in a variety of formats (e.g., tables in the RFP document), and in writing the information of baselines which may occur multiple times in the RFP document, or may be split up in several ways. The present disclosure recognizes that automatically extracting the product baseline information from the RFP document is important for time and cost saving.

Various terms used herein are detailed below. For example, a vendor refers to a company or enterprise that creates a solution in response to an opportunity expressed in an RFP document by a customer. The vendor usually needs to respond to the RFP document to provide the requested information for the customer in a timely fashion with proposed solutions and estimated costs. A customer refers to an organization who requests proposals for solutions from a vendor for certain enterprise requirements at the organization. An RFP document may refer to any type of file, in a potential variety of formats. In an example, the RFP document can be a word process program, spreadsheet program, pdf, or any other suitable document type.

The present disclosure discloses a system for automatically extracting baseline information of products and mapping the baseline information to a given terminology. The system may provide detailed analysis of tables in an RFP document. For example, the RFP document can be in the word process program, spreadsheet program, pdf, or any other suitable format. The RFP document may include one or more tables. The system may analyze the table structure and detect the table header for the tables in the RFP document. The context information of the table header may include category names, temporal context (e.g., year, month, or other time information), and spatial context (e.g., country, state, region, city, or other location information). The system may extract the context from the tables in the document and may link the extracted context to baseline names of the products. The system may map the baseline names of the customer to the associated baseline names of the vendor for the same product. The system may map the table header to subdivisions of the baselines, e.g., by years or regions.

The present disclosure will now be described in detail with reference to the Figures. FIG. 1 is a functional block diagram illustrating product baseline information extraction environment, generally designated 100, in accordance with an embodiment of the present disclosure.

In the depicted embodiment, product baseline information extraction environment 100 includes computing device 102 and network 108. Product baseline information extraction environment 100 also includes document 104. Document 104 is an RFP document from a customer to a vendor. Document 104 may be any type of file, in a potential variety of formats, for example in a word process program, spreadsheet program, pdf, or any other suitable format.

In various embodiments of the present disclosure, computing device 102 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, computing device 102 represents a computing system utilizing clustered computers and components to act as a single pool of seamless resources. In other embodiments, computing device 102 may represent a server computing system utilizing multiple computers as a server system, such as in a cloud computing environment. In general, computing device 102 can be any computing device or a combination of devices with access to product information extractor 106 and is capable of processing program instructions and executing product information extractor 106, in accordance with an embodiment of the present disclosure. Computing device 102 may include internal and external hardware components, as depicted and described in further detail with respect to FIG. 8.

Further, in the depicted embodiment, computing device 102 includes product information extractor 106 and product ontology 118. Product ontology 118 is a pre-defined product ontology from vendors. Product ontology 118 may encompass a representation, formal naming and definition of the categories, properties and relations of the products that the vendors may have. Product ontology 118 may include product names that the vendors may have and offer to the customers. In one embodiment, product ontology 118 has a hierarchical structure. For example, an existing vendor product baseline list may be extended into a hierarchy, indicating which products are part of other products. Product ontology 118 may also include information for products that are in a same category but with different sub-categories.

In the depicted embodiment, product information extractor 106 and product ontology 118 are located on computing device 102. However, in other embodiments, product information extractor 106 and product ontology 118 may be located externally and accessed through a communication network such as network 108. In some embodiments, product ontology 118 may be located on product information extractor 106. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between computing device 102 and product information extractor 106, in accordance with a desired embodiment of the disclosure.

In the depicted embodiment, product information extractor 106 includes table module 110, context module 112, natural language processing (NLP) module 114, and machine learning model 116. In the depicted embodiment, table module 110, context module 112, NLP module 114, and machine learning model 116 are located on product information extractor 106 and computing device 102. However, in other embodiments, table module 110, context module 112, NLP module 114, and machine learning model 116 may be located externally and accessed through a communication network such as network 108.

In one or more embodiments, NLP module 114 is a module of augmented intelligence or artificial intelligence concerned with analyzing, understanding, and generating natural human languages. NLP module 114 may be used by product information extractor 106 to analyze and understand texts, languages and information in document 104. NLP module 114 may be used by product information extractor 106 to analyze and understand texts, languages and information in product ontology 118.

In one or more embodiments, machine learning model 116 includes a wide variety of algorithms and methodologies that may be used by computer device 102 and product information extractor 106. Machine learning model 116 may be trained under supervision, by learning from examples and feedback, or in unsupervised mode. Machine learning model 116 may include neural networks, deep learning, support vector machines, decision trees, self-organizing maps, case-based reasoning, instance-based learning, hidden Markov models, and regression techniques. In another example, machine learning model 116 is a deep learning model that employs a multi-layer hierarchical neural network architecture and an end-to-end approach to training where machine learning model 116 is trained by a set of input data and desired output with learning happening in the intermediate layers. Machine learning model 116 may learn to adjust weights of the interconnections in the training process.

In one or more embodiments, product information extractor 106 is configured to receive document 104. In an example, document 104 is an RFP document from a customer to a vendor. Document 104 may be any type of file, in a potential variety of formats, for example in a word process program, spreadsheet program, pdf, or any other suitable format. Document 104 may include information of products that the customer asks the vendor to provide and or manage. The product information may include a key information type, for example, names and volumes of products that the customer asks the vendor to provide and or manage. In some examples, the vendor calls the product information as a baseline as the vendor uses this information as a base point, such as for creating solutions and performing cost analysis for the customer. The products, for example, may be devices, servers, software packages, services or any other solutions that the customer may ask the vendor to provide and or manage. In an example, document 104 may have one or more tables to present the product information including the names and volumes of products. In one embodiment, product information extractor 106 may convert document 104 into a structured hypertext markup language (HTML) format and process it. In another example, product information extractor 106 may receive and process document 104 directly without the conversion.

In the depicted embodiment, product information extractor 106 includes table module 110. Table module 110 is configured to detect tables in document 104. In one example, table module 110 may detect the tables based on layout analysis of document 104. Table module 110 may provide table structure analysis of the tables. Table module 110 may perform table detection and recognition using a heuristics-based algorithm. In another example, table module 110 may detect and recognize tables by classifying every cell into either a header, a title, or a data cell. In another example, table module 110 may detect the tables using machine learning model 116. In one embodiment, machine learning model 116 may be a deep learning-based model for table detection. Table module 110 may use loose rules for extracting table regions and classifies the regions using convolutional neural networks. Table module 110 may use positional information in the tables to classify it as either a table or a non-table using dense neural networks to detect the tables in document 104.

Table module 110 is configured to identify table headers of the detected tables in document 104. The table headers may be associated with information of products that the customer asks the vendor to provide or manage. Table module 110 may detect the tables with multiple column or row headers. In one example, the table headers may include temporal context associated with the products, such as year, month, date or other time information. The temporal context may be used to aggregate the associated volumes of the products by product information extractor 106. In another example, the table headers may include spatial context associated with the products, such information as country, state, region, city or other location information. The spatial context may be used to aggregate the associated volumes of the products by product information extractor 106. Table module 110 may recognize and understand the table structure. Table module 110 may filter information which is not related to the names and volumes of the products in document 104 by using NLP module 114. Table module 110 may identify columns in the tables that have names of the products, and identify rows having product volumes associated with the product names based on the columns.

In the depicted embodiment, product information extractor 106 includes context module 110. In one or more embodiments, context module 112 is configured to extract context based on the table headers from the tables in document 104. The extracted context includes names and associated volumes of the products which information is presented in the tables of document 104. Context module 110 may detect and extract the context from table captions, table titles, rows, or columns on the tables. Context module 110 may take the detected context and combine it into a product name which can be used to map an associated name of the product in product ontology 118.

In one or more embodiments, context module 112 is configured to map the extracted context information with the names of the products in the tables to the associated names of the products based on product ontology 118 using NLP module 114. In one example, NLP module 114 is a rule-based module. In another example, NLP module 114 is a machine learned based module. For example, product ontology 118 is a pre-defined product ontology from the vendor. In one embodiment, the pre-defined product ontology has a hierarchical structure. For example, an existing vendor product baseline list may be extended into a hierarchy, indicating which products are part of other products. Product ontology 118 may also include information for products that are in a same category but with different sub-categories.

In one or more embodiments, product information extractor 106 is configured to analyze which of the column headers indicate that the cell values are in fact product information (e.g., baselines), and by what split (e.g., by month, year, country) by using NLP module 114. Product information extractor 106 may summarize the associated volumes of the products with the associated names of the products based on product ontology 118. Product information extractor 106 may output the associated names and summarized volumes of the products that the customer asks the vendor to provide or manage.

Figure 2:
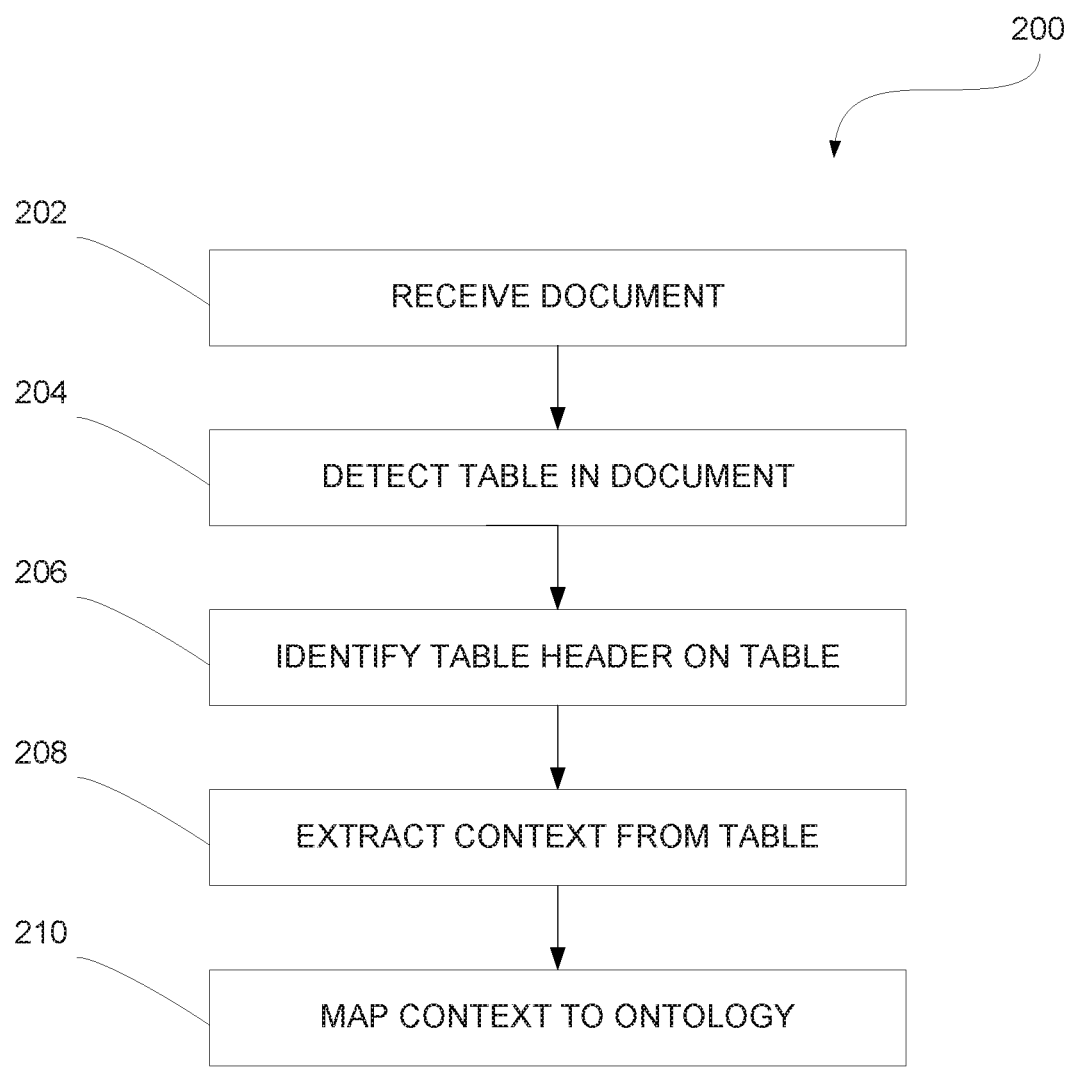
FIG. 2 is a flowchart depicting operational steps of a product information extractor within a computing device of FIG. 1, in accordance with an embodiment of the present disclosure.

FIG. 2 is a flowchart 200 depicting operational steps of product information extractor 106 in accordance with an embodiment of the present disclosure.

Product information extractor 106 operates to receive document 104 from a customer to a vendor. Product information extractor 106 operates to detect tables in document 104. Product information extractor 106 operates to identify table headers on the tables. The table headers are associated with product information. Product information extractor 106 operates to extract context based on the table headers from the tables. The context may include information of names and volumes of the products that the customer asks for the vendor. Product information extractor 106 operates to map the extracted context with the names of the products in the table to the associated names of the products based on product ontology 118.

In step 202, product information extractor 106 receives document 104. In an example, document 104 is an RFP document from a customer to a vendor. Document 104 may be any type of file, in a potential variety of formats, for example in a word process program, spreadsheet program, pdf, or any other suitable format. Document 104 may include information of products that the customer asks the vendor to provide and or manage. The product information may include a key information type, for example, the names and volumes of products that the customer asks the vendor to provide and or manage. In some examples, the vendor may call the product information as a baseline as the vendor uses this information as a base point, such as for creating solutions and performing cost analysis for the customer. The products, for example, may be devices, servers, software packages, services or any other solutions that the customer may ask the vendor to provide and or manage. In an example, document 104 may have one or more tables to present the product information including the names and volumes of products. In one embodiment, product information extractor 106 may convert document 104 into an HTML format and process it. In another example, product information extractor 106 may receive and process document 104 directly without the conversion.

In step 204, product information extractor 106 detects tables in document 104. Product information extractor 106 includes table module 110. Table module 110 may detect the tables in document 104. In one example, table module 110 may detect the tables based on layout analysis of document 104. Table module 110 may provide table structure analysis of the tables. Table module 110 may perform table detection and recognition using a heuristics-based algorithm. In another example, table module 110 may detect and recognize tables by classifying every cell into either a header, a title, or a data cell. In another example, table module 110 may detect the tables using machine learning model 116. In one embodiment, machine learning model 116 may be a deep learning-based model for table detection. Table module 110 may use loose rules for extracting table regions and classify the regions using convolutional neural networks. Table module 110 may use positional information in the tables to classify it as either a table or a non-table using dense neural networks to detect the tables in document 104.

In step 206, product information extractor 106 identifies the table headers on the tables in document 104. The table headers may be associated with information of the products that the customer asks the vendor to provide or manage. In an example, table module 110 of product information extractor 106 may identify the table headers of the detected tables in document 104. Table module 110 may detect the tables with multiple column or row headers, or with intermediate format changes, or with multiple elements in one table cell. In one example, the table headers may include temporal context associated with the products, such as year, month, date or other time information. The temporal context may be used to aggregate the associated volumes of the products. In another example, the table headers may include spatial context associated with the products, such information as country, state, region, city or other location information. The spatial context may be used to aggregate the associated volumes of the products. Table module 110 may recognize and understand the table structure. Table module 110 may filter information which is not related to the names and volumes of the products in document 104. Table module 110 may identify columns in the tables that have names of the products and may identify rows having product volumes associated with the product names based on the columns.

In step 208, product information extractor 106 extracts context based on the table headers from the tables. The context may include information of names and volumes of the products that the customer asks for the vendor. In one or more embodiments, product information extractor 106 includes context module 112 that is configured to extract the context based on the table headers from the tables in document 104. The extracted context may include names and associated volumes of the products which information is presented in the tables of document 104. Context module 110 may detect and extract the context from table captions, table titles, rows, or columns on the tables. Context module 110 may take the found context and combine it into product names by NLP module 114.

In step 210, product information extractor 106 maps the extracted context with the names of the products in the table to the associated names of the products based on product ontology 118. In one or more embodiments, context module 112 is configured to map the extracted context information with the names of the products in the tables to the associated names of the products based on product ontology 118 using NLP module 114. In one example, NLP module 114 is a rule-based module. In another example, NLP module 114 is a machine learned based module. For example, product ontology 118 may be a pre-defined product ontology from the vendor. In one embodiment, the pre-defined product ontology has a hierarchical structure. For example, an existing vendor baseline list may be extended into a hierarchy, indicating which products are part of other products. Product ontology 118 may also include information for products that are in a same category but with different sub-categories. In one or more embodiments, product information extractor 106 may analyze which of the column headers indicate that the cell values are in fact product information (e.g., baselines), and by what split (e.g., by month, year, country) by using NLP module 114. Product information extractor 106 may summarize the associated volumes of the products with the associated names of the products based on product ontology 118. Product information extractor 106 may output the associated names and summarized volumes of the products that the customer asks the vendor to provide or manage.

FIG. 3 illustrates an example table detection and product information extraction 300 of product information extractor 106 in accordance with an embodiment of the present disclosure.

In the example of FIG. 3, product information extractor 106 may detect table 302 in document 104. Product information extractor 106 may identify table header 304 of table 302. Table header 304 is associated with information of products that the customer asks the vendor to provide or manage. Product information extractor 106 may detect table 302 with multiple column or row headers. Using NLP module 114, product information extractor 106 detects table header 304 having # sign (column 310), "Category" (column 312), "Number of Physical Servers" (column 314), and year information from "2020" to "2024" (columns 306A-E). In column 312, product information extractor 106 detects and recognizes names of products that a customer asks for a vendor to provide or manage in document 104. For each row 316A through 316F, product information extractor 106 detects the associated volumes of the products named in column 312 "Category". Product information extractor 106 detects the associated volumes of the products as in column 314 "Number of Physical Servers". Further, product information extractor 106 detects the temporal context of columns 306A-E in table header 304. Product information extractor 106 may aggregate the associated volumes of the products from column 306A to column 306E. Additionally, product information extractor 106 may filter information which is not related to the names and volumes of the products in document 104. For example, product information extractor 106 may identify and filter information in column 310 by using machine learning model 116.

FIG. 4 illustrates an example table detection and product information extraction 400 of product information extractor 106 in accordance with an embodiment of the present disclosure.

In the example of FIG. 4, product information extractor 106 detects table 402 in document 104. Product information extractor 106 identifies table header 404 of table 402. Table header 404 is associated with information of products that the customer asks the vendor to provide or manage. Product information extractor 106 detects table 402 with multiple column and row headers. Using NLP module 114, product information extractor 106 detects table header 404 having "Devices" (column 306), "US" (column 408), "China" (column 410), "Japan" (column 412), and "Grand Total" (column 414). In column 406, product information extractor 106 detects and recognizes names of products that a customer asks for a vendor to provide or manage in document 104 as indicated in rows 416A through 416G. For each row 416A through 416G, product information extractor 106 detects the associated volumes of the products named in column 312 "Devices". Further, product information extractor 106 detects spatial (e.g. region) context including "US" 408, "China" 410, and "Japan" 412 in table header 404. Product information extractor 106 may aggregate the associated volumes of the products from column 306A to column 306E. Additionally, product information extractor 106 detects "Grand Total" 414 in table header 404. Product information extractor 106 detects "Grand Total" 418 from column 406. Product information extractor 106 may identify and remove duplicate information as presented in column 414.

FIG. 5 illustrates an example table detection and product information extraction 500 of product information extractor 106 in accordance with an embodiment of the present disclosure.

In the example of FIG. 5, product information extractor 106 detects table 502 in document 104. Product information extractor 106 identifies table header 504 of table 502. Table header 504 is associated with information of products that the customer asks the vendor to provide or manage. Product information extractor 106 detects table 502 with multiple column headers. Using NLP module 114, product information extractor 106 detects table header 504 having "Region" (column 506), "Campus" (column 508), and "# Servers (DCMS)" (column 510). Product information extractor 106 detects spatial (e.g. region) context under column 508. Product information extractor 106 may aggregate the associated volumes for regions in column 508 for products in column 510.

FIG. 6 illustrates an example table detection and product information extraction 600 of product information extractor 106 in accordance with an embodiment of the present disclosure.

In the example of FIG. 6, product information extractor 106 detects table 602 in document 104. Product information extractor 106 identifies table header 604 of table 602. Table header 604 is associated with information of products that the customer asks the vendor to provide or manage. Product information extractor 106 detects table 602 with multiple column and row headers. Using NLP module 114, product information extractor 106 detects table header 604 including "Description" (column 608). In column 608, product information extractor 106 detects spatial context which, for example, includes "France" in multiple cells 616A, 616B, 616C, 616D. Product information extractor 106 may associate the volumes of the products in each associated row 618A, 618B, 618C, 618D with the region information "France". Product information extractor 106 may aggregate the associated volumes for the region "France" accordingly.

FIG. 7 illustrates an example table detection and product information extraction 700 of product information extractor 106 in accordance with an embodiment of the present disclosure.

In the example of FIG. 7, product information extractor 106 detects table 702 in document 104. Product information extractor 106 identifies table header 704 of table 702. Table header 704 is associated with information of products that the customer asks the vendor to provide or manage. Using NLP module 114, product information extractor 106 detects table header 704 having "Mainframe Baselines" (column 708), "Year 1" (column 710), and "Year 2" (column 712). In column 708, product information extractor 106 detects and recognizes names of products that a customer asks for a vendor to provide or manage in document 104 as indicated in rows 714, 716. Product information extractor 106 detects context "storage" in cell 706. Product information extractor 106 detects that "mainframe" comes from table header 704 and recognize "storage" meaning "mainframe storage". Product information extractor 106 may accordingly use "mainframe storage" to map and link to an associated name in product ontology 118.

Figure 8:
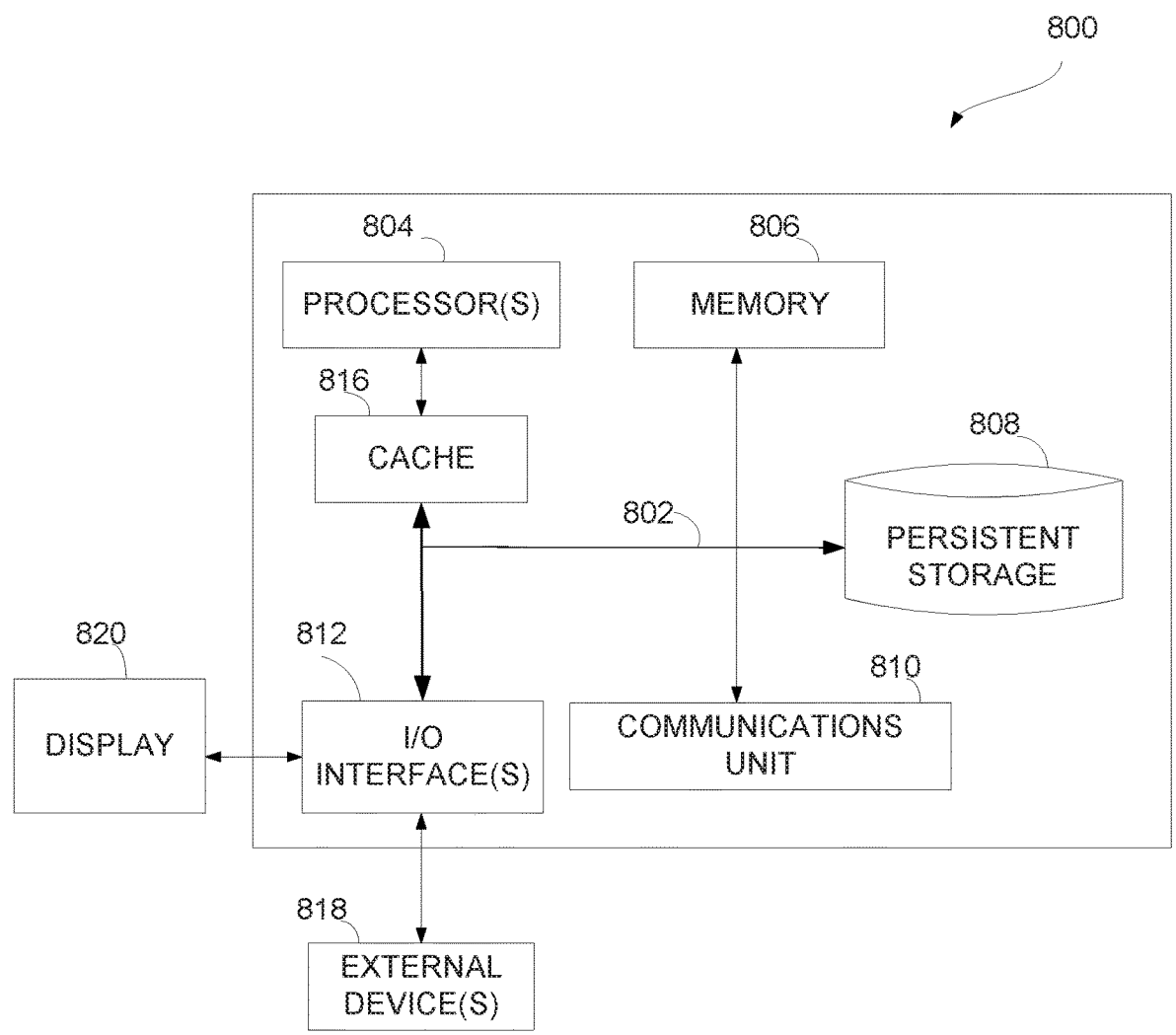
FIG. 8 is a block diagram of components of the computing device of FIG. 1, in accordance with an embodiment of the present disclosure.

FIG. 8 depicts a block diagram 800 of components of computing device 102 in accordance with an illustrative embodiment of the present disclosure. It should be appreciated that FIG. 8 provides only an illustration of one implementation and does not imply any limitations with regard to the environments in which different embodiments may be implemented. Many modifications to the depicted environment may be made.

Computing device 102 may include communications fabric 802, which provides communications between cache 816, memory 806, persistent storage 808, communications unit 810, and input/output (I/O) interface(s) 812. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses or a crossbar switch.

Memory 806 and persistent storage 808 are computer readable storage media. In this embodiment, memory 806 includes random access memory (RAM). In general, memory 806 can include any suitable volatile or non-volatile computer readable storage media. Cache 816 is a fast memory that enhances the performance of computer processor(s) 804 by holding recently accessed data, and data near accessed data, from memory 806.

Product information extractor 106, table module 110, context module 112, NLP module 114, machine learning model 116, and product ontology 118 may be stored in persistent storage 808 and in memory 806 for execution by one or more of the respective computer processors 804 via cache 816. In an embodiment, persistent storage 808 includes a magnetic hard disk drive. Alternatively, or in addition to a magnetic hard disk drive, persistent storage 808 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer readable storage medium that is also part of persistent storage 808.

Communications unit 810, in these examples, provides for communications with other data processing systems or devices. In these examples, communications unit 810 includes one or more network interface cards. Communications unit 810 may provide communications through the use of either or both physical and wireless communications links. Product information extractor 106 may be downloaded to persistent storage 808 through communications unit 810.

I/O interface(s) 812 allows for input and output of data with other devices that may be connected to computing device 102. For example, I/O interface 812 may provide a connection to external devices 818 such as a keyboard, keypad, a touch screen, and/or some other suitable input device. External devices 818 can also include portable computer readable storage media such as, for example, thumb drives, portable optical or magnetic disks, and memory cards. Software and data used to practice embodiments of the present invention, e.g., product information extractor 106 can be stored on such portable computer readable storage media and can be loaded onto persistent storage 808 via I/O interface(s) 812. I/O interface(s) 812 also connect to display 820.

Display 820 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method comprising:
receiving, by one or more processors, a document;
detecting, by one or more processors, a table in the document;
identifying, by one or more processors, a table header on the table, the table header being associated with a name and a volume of a product, wherein identifying the table header includes:
filtering information which is unrelated to the name and the volume of the product in the document by using natural language processing that analyzes and understands text, languages and information in the document,
identifying temporal context associated with the product, the temporal context being used to aggregate the volume of the product, and
identifying spatial context associated with the product, the spatial context being used to aggregate the volume of the product;
extracting, by one or more processors, context based on the table header from the table, the context including the name and the volume of the product, wherein extracting the context includes linking the context to the name of the product;
mapping, by one or more processors, the extracted context with the name of the product in the table to an associated name of the product based on a pre-defined product ontology, wherein the pre-defined product ontology encompasses representation, formal naming and definition of categories, properties and relations of products, wherein the pre-defined product ontology has a hierarchical structure indicating which product is part of another product;
summarizing, by one or more processors, the volume of the product with the associated name of the product based on the pre-defined product ontology; and
outputting, by one or more processors, the associated name and summarized volume of the product.

2. The computer-implemented method of claim 1, wherein detecting the table in the document includes:
identifying a column having the name of the product, and
identifying a row having the volume associated with the name based on the column.

3. A computer program product comprising:
one or more computer readable storage media, and program instructions collectively stored on the one or more computer readable storage media, the program instructions comprising:
program instructions to receive a document;
program instructions to detect a table in the document;
program instructions to identify a table header on the table, the table header being associated with a name and a volume of a product, wherein program instructions to identify the table header include:
program instructions to filter information which is unrelated to the name and the volume of the product in the document by using natural language processing that analyzes and understands text, languages and information in the document,
program instructions to identify temporal context associated with the product, the temporal context being used to aggregate the volume of the product, and
program instructions to identify spatial context associated with the product, the spatial context being used to aggregate the volume of the product;
program instructions to extract context based on the table header from the table, the context including the name and the volume of the product, wherein program instructions to extract the context include program instructions to link the context to the name of the product;
program instructions to map the extracted context with the name of the product in the table to an associated name of the product based on a pre-defined product ontology, wherein the pre-defined product ontology encompasses representation, formal naming and definition of categories, properties and relations of products, wherein the pre-defined product ontology has a hierarchical structure indicating which product is part of another product;
program instructions to summarize the volume of the product with the associated name of the product based on the pre-defined product ontology; and
program instructions to output the associated name and summarized volume of the product.

4. The computer program product of claim 3, wherein program instructions to detect the table in the document include:
program instructions, stored on the one or more computer-readable storage media, to identify a column having the name of the product, and
program instructions, stored on the one or more computer-readable storage media, to identify a row having the volume associated with the name based on the column.

5. A computer system comprising:
one or more computer processors, one or more computer readable storage media, and program instructions stored on the one or more computer readable storage media for execution by at least one of the one or more computer processors, the program instructions comprising:
program instructions to receive a document;
program instructions to detect a table in the document;
program instructions to identify a table header on the table, the table header being associated with a name and a volume of a product, wherein program instructions to identify the table header include:
program instructions to filter information which is unrelated to the name and the volume of the product in the document by using natural language processing that analyzes and understands text, languages and information in the document,
program instructions to identify temporal context associated with the product, the temporal context being used to aggregate the volume of the product, and
program instructions to identify spatial context associated with the product, the spatial context being used to aggregate the volume of the product;
program instructions to extract context based on the table header from the table, the context including the name and the volume of the product, wherein program instructions to extract the context include program instructions to link the context to the name of the product;
program instructions to map the extracted context with the name of the product in the table to an associated name of the product based on a pre-defined product ontology, wherein the pre-defined product ontology encompasses representation, formal naming and definition of categories, properties and relations of products, wherein the pre-defined product ontology has a hierarchical structure indicating which product is part of another product;

program instructions to summarize the volume of the product with the associated name of the product based on the pre-defined product ontology; and program instructions to output the associated name and summarized volume of the product.

6. The computer system of claim 5, wherein program instructions to detect the table in the document include:

program instructions, stored on the one or more computer-readable storage media, to identify a column having the name of the product, and program instructions, stored on the one or more computer-readable storage media, to identify a row having the volume associated with the name based on the column.

* * * * *